US012337695B2

(12) United States Patent
Oguro

(10) Patent No.: US 12,337,695 B2
(45) Date of Patent: Jun. 24, 2025

(54) DRIVE CONTROL APPARATUS FOR ELECTRIC VEHICLE

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 338 days.

(21) Appl. No.: 18/048,166

(22) Filed: Oct. 20, 2022

(65) Prior Publication Data
US 2023/0166606 A1 Jun. 1, 2023

(30) Foreign Application Priority Data
Nov. 29, 2021 (JP) .................................. 2021-192945

(51) Int. Cl.
*B60L 15/20* (2006.01)
*H02P 23/14* (2006.01)

(52) U.S. Cl.
CPC .............. *B60L 15/20* (2013.01); *H02P 23/14* (2013.01)

(58) Field of Classification Search
CPC ................................ B60L 15/20; H02P 23/14
See application file for complete search history.

(56) References Cited

U.S. PATENT DOCUMENTS

| 11,161,514 | B2* | 11/2021 | Velazquez Alcantar ..................... B60L 15/2009 |
| 2014/0379190 | A1* | 12/2014 | Sawada ..................... B60L 7/14 701/22 |
| 2016/0221468 | A1* | 8/2016 | Suzuki ..................... B60L 3/106 |
| 2019/0291591 | A1* | 9/2019 | Suzuki ..................... B60L 3/104 |
| 2021/0078581 | A1* | 3/2021 | Velazquez Alcantar ..................... B60L 3/10 |
| 2023/0391204 | A1* | 12/2023 | Taira ................... B60K 23/0808 |

FOREIGN PATENT DOCUMENTS

JP 2018-093645 A 6/2018

* cited by examiner

*Primary Examiner* — Peter D Nolan
*Assistant Examiner* — Mikko Okechukwu Obioha
(74) *Attorney, Agent, or Firm* — Rimon P.C.

(57) ABSTRACT

A drive control apparatus to be applied to an electric vehicle includes a controller. The controller is configured to limit a change rate of a torque to be outputted from an electric motor of the electric vehicle on the basis of a first limit mode in a case where the torque is less than a threshold torque, in a period of a first traveling state in which the electric vehicle travels on an uphill road where a level of likelihood of an occurrence of a slip is estimated to be equal to or greater than a threshold, and configured to limit the change rate of the torque on the basis of a second limit mode that is more flexible than the first limit mode in a case where the torque is equal to or greater than the threshold torque in the period of the first traveling state.

13 Claims, 9 Drawing Sheets

| FIRST LIMIT MODE | |
|---|---|
| CHANGE RATE [Nm/s] | TORQUE DIFFERENCE [Nm] = \|COMMAND TORQUE − CURRENTLY-OUTPUTTED TORQUE\|<br>SMALL ←——————————————→ LARGE |
| ELAPSED TIME [s]<br>SHORT ↕ LONG | SMALL ←——————————————→ SMALL<br>↕ ⤫ ↕<br>MEDIUM ←——————————————→ LARGE |

FIG. 2A

| SECOND LIMIT MODE | |
|---|---|
| CHANGE RATE [Nm/s] | TORQUE DIFFERENCE [Nm] = \|COMMAND TORQUE − CURRENTLY-OUTPUTTED TORQUE\|<br>SMALL ←——————————————→ LARGE |
| ELAPSED TIME [s]<br>SHORT ↕ LONG | SMALL ←——————————————→ SMALL<br>↕ ⤫ ↕<br>SMALL ←——————————————→ MEDIUM |

FIG. 2B

DRIVE CONTROL APPARATUS FOR ELECTRIC VEHICLE

CROSS-REFERENCE TO RELATED APPLICATIONS

The present application claims priority from Japanese Patent Application No. 2021-192945 filed on Nov. 29, 2021, the entire contents of which are hereby incorporated by reference.

BACKGROUND

The disclosure relates to a drive control apparatus of an electric vehicle.

Japanese Unexamined Patent Application Publication (JP-A) No. 2018-093645 discloses a torque control of a four-wheel-drive vehicle. The torque control sets parameters related to a change rate of a torque, on the basis of an estimated inclination of a road surface. JP-A No. 2018-093645 discloses that the setting of the parameters avoids a simultaneous slip of front wheels and rear wheels upon starting on an uphill road and prevents, for example, sliding down of the vehicle.

SUMMARY

An aspect of the disclosure provides a drive control apparatus to be applied to an electric vehicle that includes a drive wheel and an electric motor configured to drive the drive wheel. The drive control apparatus includes a controller. The controller is configured to control a torque to be outputted from the electric motor, on the basis of an amount of operation of an accelerator as an accelerator operation amount and a state of the electric vehicle as a vehicle state. The controller is configured to limit a change rate of the torque on the basis of a first limit mode in a case where the torque is less than a threshold torque, in a period of a first traveling state in which the electric vehicle travels on an uphill road where a level of likelihood of an occurrence of a slip is estimated to be equal to or greater than a threshold. The controller is configured to limit the change rate of the torque on the basis of a second limit mode that is more flexible than the first limit mode in a case where the torque is equal to or greater than the threshold torque in the period of the first traveling state.

An aspect of the disclosure provides a drive control apparatus to be applied to an electric vehicle that includes a drive wheel and an electric motor configured to drive the drive wheel. The drive control apparatus includes circuitry. The circuitry is configured to control a torque to be outputted from the electric motor, on the basis of an amount of operation of an accelerator as an accelerator operation amount and a state of the electric vehicle as a vehicle state. The circuitry is configured to limit a change rate of the torque on the basis of a first limit mode in a case where the torque is less than a threshold torque, in a period of a first traveling state in which the electric vehicle travels on an uphill road where a level of likelihood of an occurrence of a slip is estimated to be equal to or greater than a threshold. The circuitry is configured to limit the change rate of the torque on the basis of a second limit mode that is more flexible than the first limit mode in a case where the torque is equal to or greater than the threshold torque in the period of the first traveling state.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 2A is a diagram illustrating an example of a first limit mode of a change rate of a torque.

FIG. 2B is a diagram illustrating an example of a second limit mode of the change rate of the torque.

DETAILED DESCRIPTION

Figure 1:
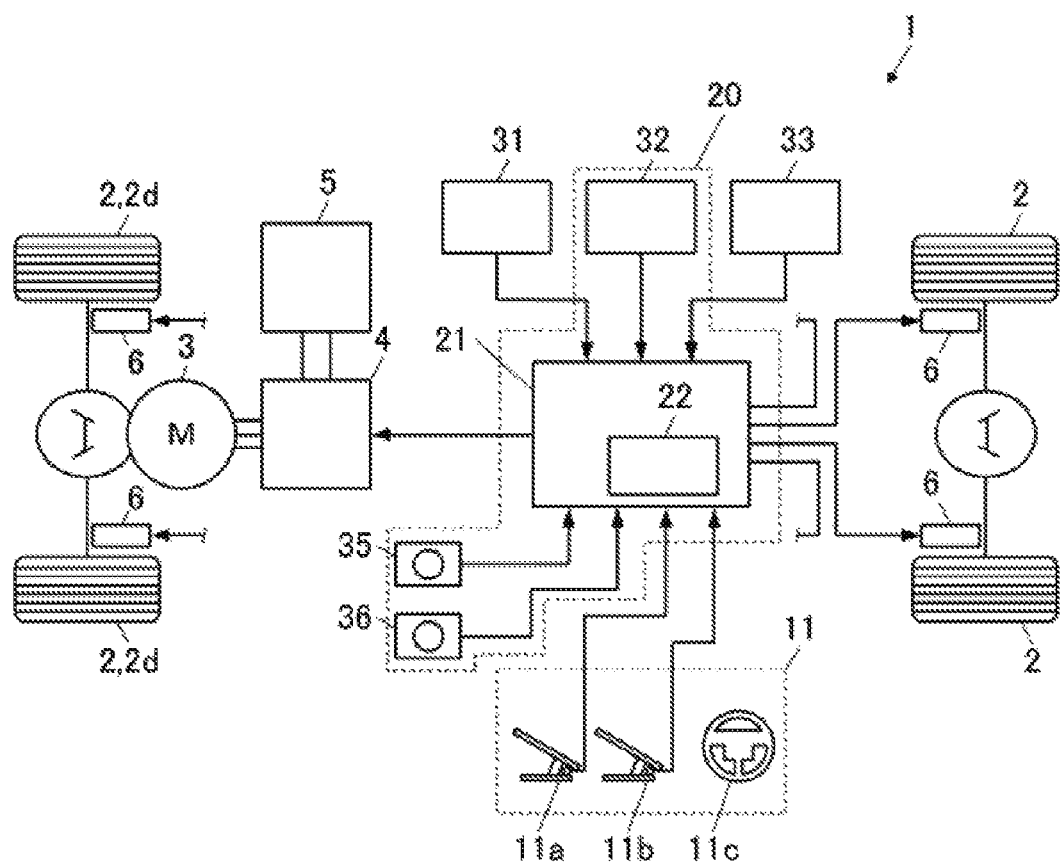
FIG. 1 is a block diagram illustrating an electric vehicle and a drive control apparatus according to one example embodiment of the disclosure.

It is possible to suppress a sudden change in a torque and to reduce an occurrence of a slip by limiting a change rate of the torque to a small value during traveling on an uphill road with a low frictional resistance. However, when the change rate of the torque is limited to a small value, it takes time to output a torque that makes it possible to support a vehicle weight along an inclination, even when a driver who drives a vehicle has performed with haste an accelerator operation in a case where the torque once becomes small. In this case, the vehicle can slide down.

It is desirable to provide a drive control apparatus of an electric vehicle which makes it possible to suppress both a slip and sliding down of the vehicle upon traveling on an uphill road where the slip can occur.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is a block diagram illustrating an electric vehicle 1 and a drive control apparatus 20 according to a first example embodiment of the disclosure. The electric vehicle 1 according to the first example embodiment may include: drive wheels 2d; an electric motor 3 that drives the drive wheels 2d; an inverter 4 that outputs a drive current to the electric motor 3; a battery 5 that accumulates electric power to be supplied to the electric motor 3; and a braking device 6 that brakes the electric vehicle 1. The electric vehicle 1 may also include: a driving operation unit 11 to be operated by, for example, a driver who drives the electric vehicle 1; and a controller 21 that controls driving of the electric motor 3 on the basis of the operation of the driving operation unit 11 and a vehicle state. The electric vehicle 1 may further include, as devices that detect the vehicle state: a vehicle speed sensor 31 that detects a vehicle speed; a first detection device 32 configured to detect an inclination of a traveling road surface; and a second detection device 33 that determines an occurrence of a slip of the drive wheels 2d. The electric vehicle 1 may further include switches 35 and 36 that allow the driver to operate and select information related to a torque control. The switches 35 and 36 may be provided on a panel of a driver's seat, or may be provided on a steering unit 11c such as a steering wheel.

The drive control apparatus 20 according to the first example embodiment may include the controller 21, the first detection device 32, and the switches 35 and 36 in the configuration described above.

The driving operation unit 11 may include: a brake operation unit 11a such as a brake pedal; an accelerator operation unit 11b such as an accelerator pedal; and the steering unit 11c such as the steering wheel. A signal that indicates an amount of operation of the brake operation unit 11a and a signal that indicates an amount of operation of the accelerator operation unit 11b may be transmitted to the controller 21. In the following, the operation amount of the accelerator operation unit 11b is referred to as an "accelerator operation amount".

For example, the vehicle speed sensor 31 may have: a configuration that detects a rotation speed of a plurality of wheels 2 including the drive wheels 2d; a configuration in which an acceleration sensor is added to the configuration described previously; or a configuration that determines the vehicle speed on the basis of a positioning device such as GPS (Global Positioning System) and a plurality of positioning results. Besides, the vehicle speed sensor 31 may have any configuration as long as the vehicle speed sensor 31 is able to detect the vehicle speed.

The first detection device 32 may detect the inclination. For example, the first detection device 32 may be a plurality of acceleration sensors disposed at the front and the rear of the electric vehicle 1, or may have a configuration in which a gyroscope sensor and a magnetic sensor are combined. Besides, the first detection device 32 may have any configuration as long as the first detection device 32 is able to detect the inclination of a traveling road.

The second detection device 33 may determine a slip of the drive wheels 2d. For example, the second detection device 33 may have: a configuration in which a wheel speed sensor of the drive wheels 2d and a wheel speed sensor of driven wheels are combined; or a configuration in which a wheel speed sensor and an acceleration sensor are combined.

In some embodiments, the second detection device 33 may have a configuration in which the wheel speed sensor of the drive wheels 2d and various vehicle speed sensors are combined. Upon an occurrence of the slip of the drive wheels 2d, the wheel speed of the drive wheels 2d can have a value that does not correspond to the wheel speed of any other wheel 2, or a value that does not correspond to a speed or an acceleration rate of the electric vehicle 1. The second detection device 33 may detect the occurrence of the slip of the drive wheels 2d by detecting any of the phenomena described above. Besides, the second detection device 33 may have any configuration as long as the second detection device 33 is able to detect a physical quantity that allows for the determination of the occurrence of the slip of the drive wheels 2d.

The controller 21 may be a single ECU (Electronic Control Unit), or may include a plurality of ECUs that performs communication with each other to operate in conjunction with each other. The controller 21 may include a storage device 22 that holds a control program and control data. The controller 21 may control the driving of the electric motor 3 by executing the control program held in the storage device 22. The controller 21 may control a torque to be outputted from the electric motor 3 by controlling an operation of the inverter 4. The controller 21 may control a braking force of the electric vehicle 1 by driving the braking device 6.

The controller 21 may calculate a command torque on the basis of the vehicle speed and the accelerator operation amount, and determine a torque to be actually outputted from the electric motor 3 on the basis of the command torque and a currently generated torque. In a case where the torque is determined, the controller 21 may so control the inverter 4 that the determined torque is outputted, allowing the determined torque to be outputted from the electric motor 3.

Upon determining the torque on the basis of the command torque, the controller 21 limits a change rate of the torque such that the torque does not change suddenly. The controller 21 determines a limit mode of the change rate of the torque on the basis of a traveling state of the electric vehicle 1 as follows.

The controller 21 limits the change rate of the torque on the basis of a first limit mode, in a case where the torque is less than a threshold torque in a period of a first traveling state. The first traveling state is a traveling state in which the electric vehicle 1 travels on an uphill road where a level of likelihood of the occurrence of the slip is estimated to be equal to or greater than a threshold. The controller 21 limits the change rate of the torque on the basis of a second limit mode that is more flexible than the first limit mode, in a case where the torque is equal to or greater than the threshold torque in the period of the first traveling state described above.

In one embodiment, the wording "traveling on the uphill road", a method of estimating "the level of the likelihood of the occurrence of the slip", and the wordings "the first limit mode", "the second limit mode", and the "threshold torque" may be defined as follows.

The wording "traveling on the uphill road" may refer to traveling on a road surface having an inclination of equal to or greater than a predetermined angle in a climbing direction, i.e., an inclination in a vertical cross-section in a traveling direction. In some embodiments, the predetermined angle may be 5 degrees or greater. Accordingly, in some embodiments, traveling on an uphill road having a smaller inclination that is less than the predetermined angle may be excluded from the wording "traveling on the uphill road" mentioned above.

The method of estimating "the level of the likelihood of the occurrence of the slip" mentioned above may be an estimation method based on whether the slip of the drive wheels 2d has actually occurred. For example, the controller 21 may estimate that the level of the likelihood of the occurrence of the slip of the relevant uphill road is equal to or greater than the threshold in a case where the slip has occurred. In a case where the estimation is made as described above, the controller 21 may maintain a result of the estimation described above until the uphill road returns to a flat road thereafter, until the electric vehicle 1 stops in a parking range thereafter, or until a power of a system of the electric vehicle 1 is turned off thereafter. In some embodiments, the electric vehicle 1 may include a device that detects a state of a traveling road surface. In such embodiments, the controller 21 may estimate a relevant road as the uphill road in which the level of the likelihood of the occurrence of the slip is equal to or greater than the threshold, until, in a case where the controller 21 has determined that the slip has occurred on the uphill road, a state of a road surface thereafter changes to a road surface in which the slip is difficult to occur, such as a dry paved road surface.

It should be noted that the method of estimating "the level of the likelihood of the occurrence of the slip" is not limited to any of the examples described above. In some embodiments, the method of estimating the level described above may be based on a detection of the state of the traveling road surface. The device that detects the state of the traveling road surface may be a camera and an analyzer of a road surface picture, a vibration sensor, a road surface temperature sensor, a map database that indicates a road surface state and a positioning device, or any combination thereof. In a case where the controller 21 has determined, on the basis of a result of the detection by any of the devices mentioned above, that the road is the uphill road in which the slip would occur if, for example, a predetermined torque is outputted to the drive wheels 2d, the controller 21 may estimate the determined uphill road as the uphill road in which the level of the likelihood of the occurrence of the slip is equal to or greater than the threshold. In this example, the predetermined torque described above may be set as the threshold torque in which the slip is estimated to occur.

Figure 3A:
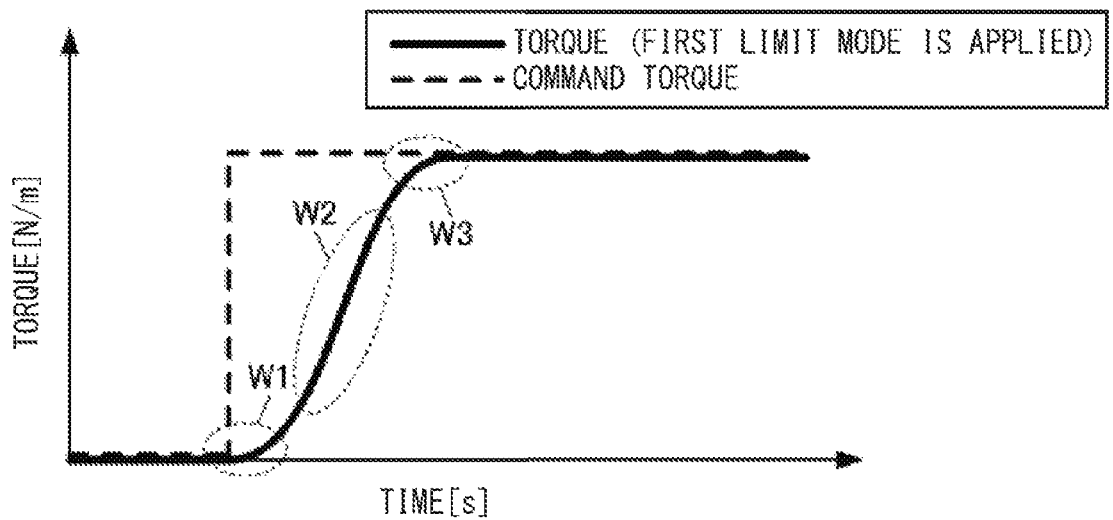
FIG. 3A is a diagram illustrating an example of a change in a torque where the first limit mode is applied.
Figure 3B:
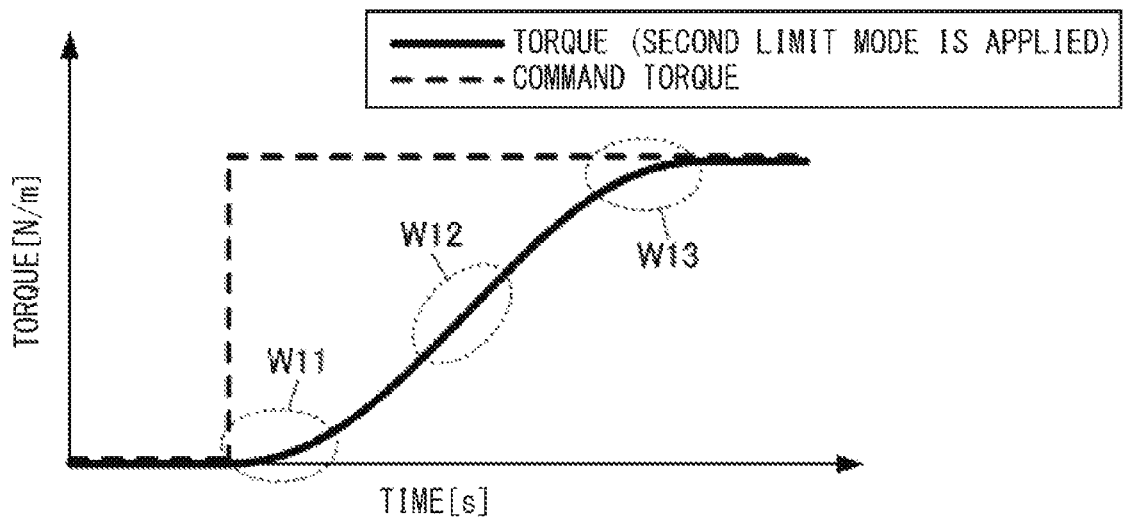
FIG. 3B is a diagram illustrating an example of a change in the torque where the second limit mode is applied.

FIG. 2A is a diagram illustrating an example of the first limit mode of the change rate of the torque. FIG. 2B is a diagram illustrating an example of the second limit mode of the change rate of the torque. FIG. 3A is a diagram illustrating an example of a change in a torque where the first limit mode is applied. FIG. 3B is a diagram illustrating an example of a change in the torque where the second limit mode is applied.

The "first limit mode" may refer to one of the modes that limit the change rate of the torque. The first limit mode may be a mode in which the change rate to be limited is changed as follows, on the basis of a torque difference as a difference between the command torque and the currently generated torque and an elapsed time from the occurrence of the torque difference. For example, referring to FIG. 2A, the change rate may change to have a smaller value in a case where the torque difference is smaller and the elapsed time is shorter. The change rate may change to have a medium value in a case where the torque difference is smaller and the elapsed time is longer. The change rate may change to have a smaller value in a case where the torque difference is larger and the elapsed time is shorter. The change rate may change to have a larger value in a case where the torque difference is larger and the elapsed time is longer.

FIG. 3A illustrate a change in a torque in a case where a sudden accelerator operation is performed from a torque zero and the command torque thus has a large value during the application of the first limit mode. In a case where such an accelerator operation is performed, the torque may increase at a small change rate even when the torque difference is large in a region W1 in which the elapsed time is short, and the torque may increase at a large change rate when the elapsed time becomes long (i.e., a region W2). Further, the torque may approach the command torque at a small change rate when the torque difference becomes small despite the long elapsed time (i.e., a region W3).

The "first limit mode" may be a limit mode that includes, or is the same as, a limit mode of the change rate to be used by the controller 21 upon calculating the torque on the basis of the command torque in a second traveling state in which the occurrence of the slip of the drive wheels 2d is absent. In some embodiments, the second traveling state may be a normal traveling state. The first limit mode helps to achieve a relatively quick torque responsiveness with respect to the accelerator operation.

It should be noted that the "first limit mode" is not limited to an example described above. In some embodiments, the first limit mode may be a mode in which the change rate of the torque is fixed to a predetermined value. Even in this example, a value of the change rate may be set to a larger value than the change rate of the torque that is based on the second limit mode.

The "second limit mode" may refer to one of the modes that limit the change rate of the torque, and may be a mode in which a change rate that is more flexible than that of the first limit mode is applied. The second limit mode may be a mode in which the change rate to be limited is changed as follows, on the basis of the torque difference as the difference between the command torque and the currently generated torque and the elapsed time from the occurrence of the torque difference. For example, referring to FIG. 2B, the change rate may change to have a smaller value in a case where the torque difference is smaller and the elapsed time is shorter. The change rate may change to have a smaller value in a case where the torque difference is smaller and the elapsed time is longer. The change rate may change to have a smaller value in a case where the torque difference is larger and the elapsed time is shorter. The change rate may change to have a medium value in a case where the torque difference is larger and the elapsed time is longer.

FIG. 3B illustrate a change in a torque in a case where the sudden accelerator operation is performed from the torque zero and the command torque thus has a large value during the application of the second limit mode. In this case, the torque may change at a smaller change rate than the first limit mode in each of a region W11 in which the elapsed time is short, a region W12 in which the elapsed time is longer, and a region W13 in which the torque difference is small despite the long elapsed time.

The "second limit mode" may be a limit mode that includes, or is the same as, a limit mode of the change rate to be used by the controller 21 upon calculating the torque in a third traveling state in which the slip of the drive wheels 2d has occurred other than on the uphill road. In some embodiments, the third traveling state may be a traveling state on a road with a low frictional resistance. The second limit mode may involve a low responsiveness of the torque with respect to the accelerator operation as compared with the first limit mode.

It should be noted that the "second limit mode" is not limited to an example described above. In some embodiments, the second limit mode may be a mode in which the change rate of the torque is fixed to a predetermined value. Even in this example, a value of the change rate may be set to a smaller value than the change rate of the torque that is based on the first limit mode.

The change rate of the second limit mode which is more flexible than the change rate of the first limit mode may refer to a situation where a value of the change rate of the second limit mode becomes equal to or less than a value of the change rate of the first limit mode if the conditions (e.g., the torque difference and the elapsed time) are the same.

The "threshold torque" described above may be set to a value estimated as the torque where the drive wheels $2d$ start to slip, or estimated as the torque that is at the time immediately prior to the occurrence of the slip. In a case where the drive wheels $2d$ slip and a traveling state is determined as being the first traveling state, the controller may set the torque that is outputted upon the occurrence of the slip as the threshold torque. Upon setting the threshold torque, the torque outputted upon the occurrence of the slip and the threshold torque may have a positive correlation. For example, the threshold torque may have a smaller value in a case where the torque outputted upon the occurrence of the slip is smaller, and may have a larger value in a case where the torque outputted upon the occurrence of the slip is larger.

It should be noted that the threshold torque is not limited to an example described above. In some embodiments, the threshold torque may be set as a value that is equal to or greater than the torque value that makes it possible to restrain the sliding down of the electric vehicle 1, which may be calculated on the basis of an inclination of an uphill road and a vehicle weight. In some embodiments, the threshold torque may be set to a value that has a positive correlation with the torque outputted upon the occurrence of the slip, and that is smaller or larger in value than the torque outputted upon the occurrence of the slip.

Operation Example

Figure 4:
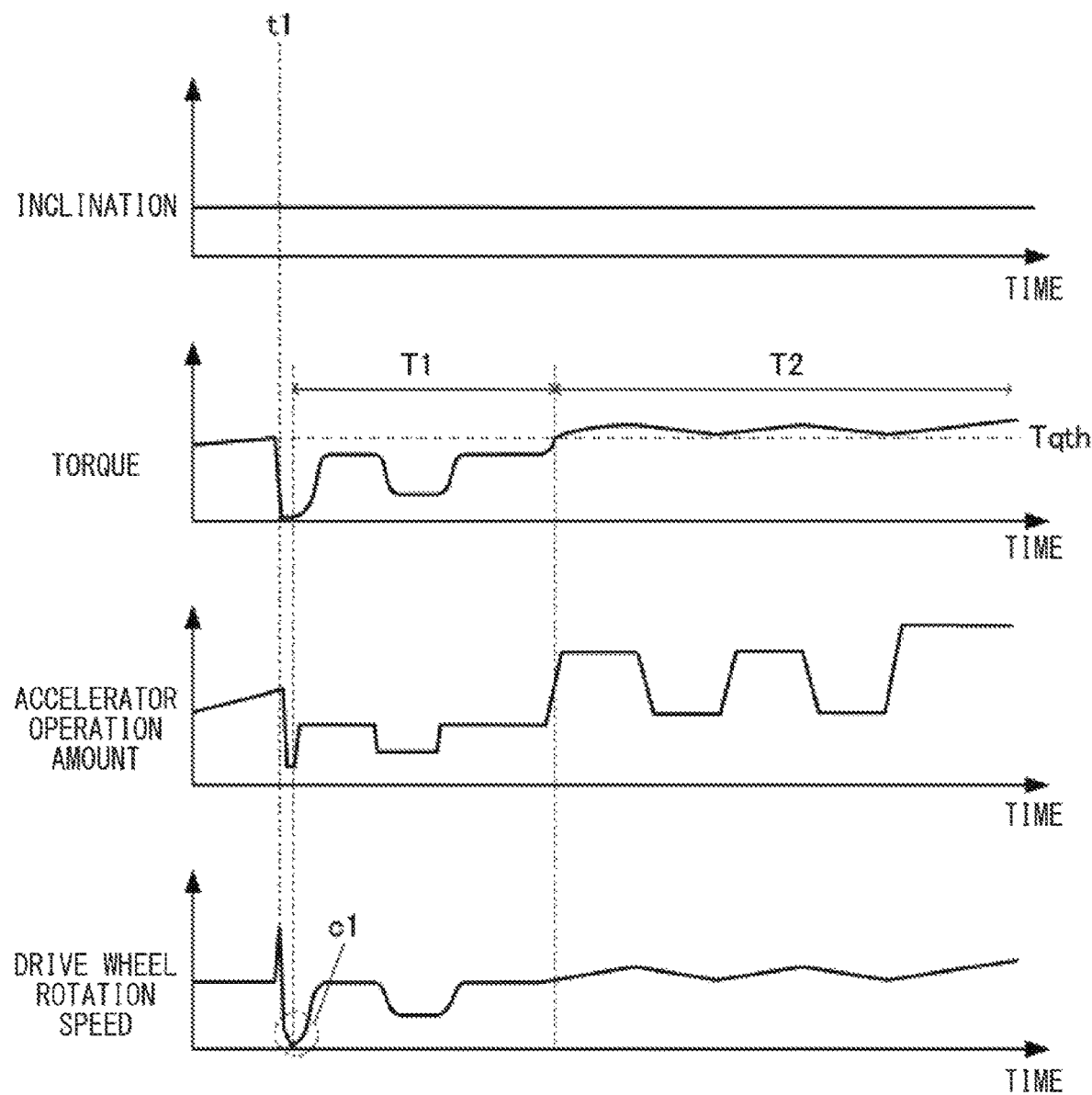
FIG. 4 is a time chart illustrating an example of an operation of the electric vehicle according to one example embodiment.

FIG. 4 is a time chart illustrating an example of an operation of the electric vehicle 1 according to the first example embodiment. In a case where the slip of the drive wheels $2d$ has occurred during traveling on the uphill road (timing t1), the controller 21 may determine a traveling state as the first traveling state, and may start a torque control based on the first traveling state. Here, the controller 21 may hold, as a threshold torque Tqth, the torque outputted to the drive wheels $2d$ upon the occurrence of the slip.

After the occurrence of the slip, the electric vehicle 1 may stop or become a traveling state close to the stop of the electric vehicle 1 (operation c1) as a result of a brake operation performed by the driver, or as a result of an accelerator operation performed by the driver in which the accelerator is less pressed down. Alternatively, the controller 21 may perform the torque control that addresses the slip in response to the occurrence of the slip, which causes the torque of the electric vehicle 1 to be small accordingly and which in turn causes the electric vehicle 1 to be in the traveling state close to the stop of the electric vehicle 1 (the operation c1).

Thereafter, in a case where the driver has performed the accelerator operation again to continue the traveling of the electric vehicle 1, the controller 21 may apply the change rate that is based on the first limit mode to calculate the torque in a range in which the torque is less than the threshold torque Tqth (period T1). By applying the first limit mode, the torque increases with a relatively high responsiveness, which helps to suppress the electric vehicle 1 from sliding down on the uphill road by the own weight.

If the driver performs the accelerator operation in a range in which the torque is equal to or greater than the threshold torque Tqth (period T2), the controller 21 may apply the change rate that is based on the second limit mode to calculate the torque. This helps to suppress the sudden change in the torque and to allow the driver to continue the traveling in which the slip is difficult to occur.

[Drive Control Process]

Figure 5:
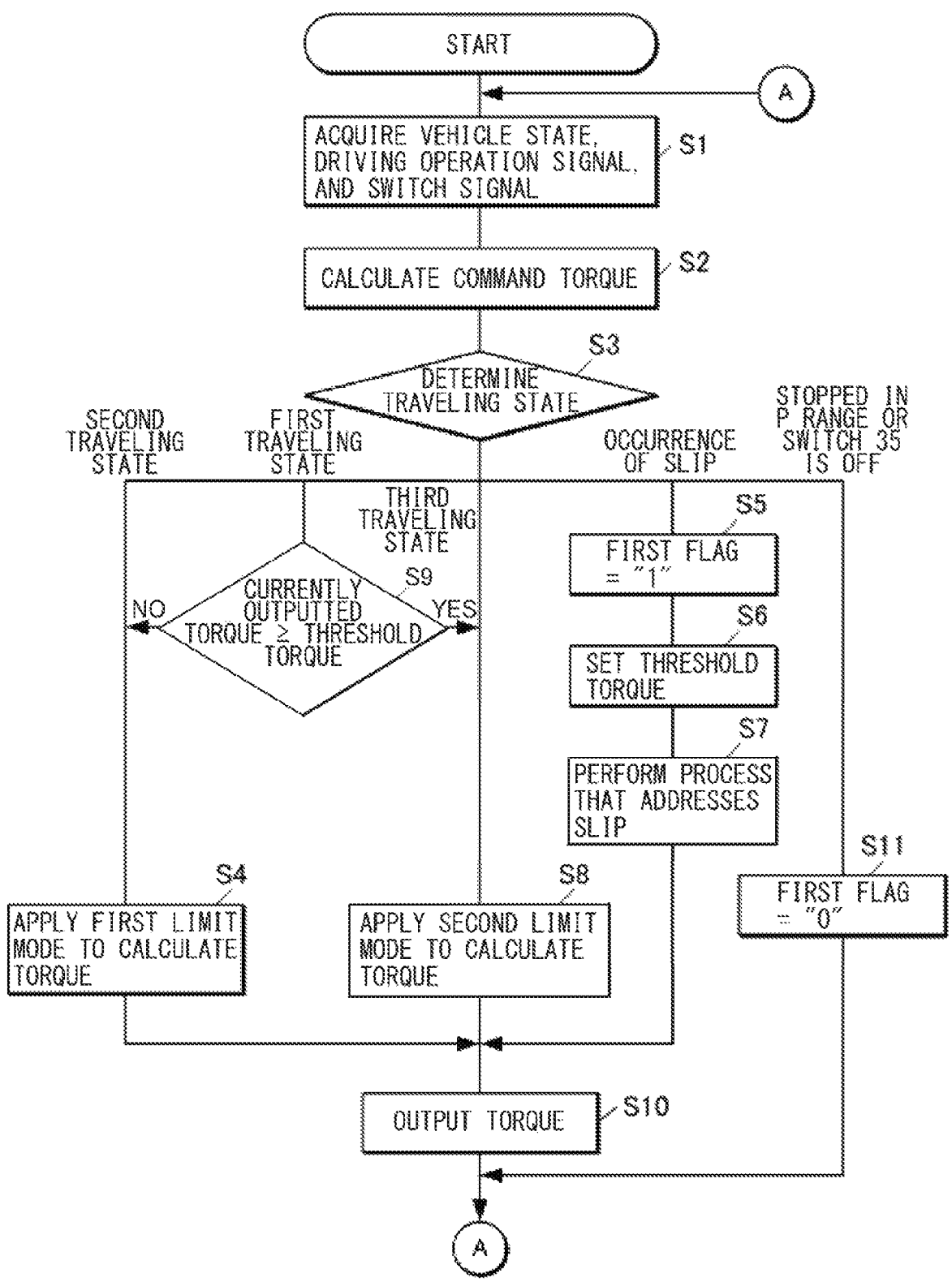
FIG. 5 is a flowchart illustrating a drive control process to be executed by a controller of one example embodiment.

Described next is an example of a drive control process that achieves the operation of the electric vehicle 1 described above. FIG. 5 is a flowchart illustrating the drive control process to be executed by the controller 21.

The drive control process may be started upon start-up of a system of the electric vehicle 1, and may be executed continuously by the controller 21 during the system operation. First, upon the start of the drive control process, the controller 21 may acquire pieces of detection data from the vehicle speed sensor 31, the first detection device 32, and the second detection device 33, and may acquire operation signals from the driving operation unit 11 and the switch 35 (step S1).

Thereafter, the controller 21 may calculate the command torque on the basis of the vehicle speed and the accelerator operation amount, from the acquired pieces of detection data and operation signals (step S2). It should be noted that the electric motor 3 may have torque characteristics in which the maximum torque is large when the rotation speed is low, and the maximum torque is small when the rotation speed is high. In some embodiments, in step S2, the controller 21 may calculate the command torque in response to the torque characteristics of the electric motor 3. For example, in a case where the accelerator operation amount is the maximum, the controller 21 may so calculate the command torque that the command torque has a value that is based on the maximum torque or a value near thereto of the electric motor 3 which corresponds to the rotation speed (e.g., the rotation speed converted from the vehicle speed) that is at the time when the accelerator operation amount is the maximum. In another example, in a case where the rotation speed of the electric motor 3 is the same, the controller 21 may so calculate the command torque that, as the accelerator operation amount becomes smaller, the torque gradually becomes smaller from the maximum torque corresponding to the rotation speed mentioned above.

Thereafter, the controller 21 may determine the traveling state of the electric vehicle 1, on the basis of the signals acquired in step S1 (step S3). The conditions of the first traveling state, the second traveling state, and the third traveling state to be determined in step S3 may be as described above. In the following, described is the drive control process according to an example embodiment in which the controller 21 estimates that the level of the likelihood of the occurrence of the slip is equal to or greater than the threshold due to the presence of the occurrence of the slip and determines that the traveling state is the first traveling state.

If the traveling state is determined as being the second traveling state (e.g., the normal traveling state) as a result of the determination process in step S3, the controller 21 may apply the change rate that is based on the first limit mode to determine the torque to be actually outputted by the electric motor 3, on the basis of the command torque and the currently outputted torque (step S4).

Thereafter, the controller 21 may so control the inverter 4 that the determined torque is outputted (step S10). Thereafter, the controller 21 may return the process to step S1.

If the occurrence of the slip is determined in the determination process in step S3, the controller 21 may set, to "1", a first flag indicating that the slip has occurred (step S5), and may set, as the threshold torque, the torque outputted from the electric motor 3 at that time (step S6). Further, the controller 21 may execute a process that addresses the slip (step S7). For example, the controller 21 may once reduce the torque. Thereafter, the controller 21 may perform the output process of the torque in step S10, and may thereafter return the process to step S1.

In the determination process in step S3, the controller 21 may determine that the slip has occurred in a case where the first flag is "1", and may determine that the traveling state is the third traveling state (e.g., the traveling state in which the occurrence of the slip of the drive wheels 2d is present other than on the uphill road) when the road is not the uphill road. In this case, the controller 21 may apply the change rate that is based on the second limit mode to determine the torque to be actually outputted by the electric motor 3, on the basis of the command torque and the currently outputted torque (step S8).

Thereafter, the controller 21 may so control the inverter 4 that the determined torque is outputted (step S10). Thereafter, the controller 21 may return the process to step S1.

If the traveling state is determined as being the first traveling state (e.g., the traveling state on the uphill road with the slip of the drive wheels 2d having occurred) as a result of the determination process in step S3, the controller 21 may determine whether the currently outputted torque is less than the threshold torque or equal to or greater than the threshold torque (step S9). If the currently outputted torque is equal to or greater than the threshold torque (step S9: YES), the controller 21 may apply the change rate that is based on the second limit mode to determine the torque to be actually outputted by the electric motor 3, on the basis of the command torque and the currently outputted torque (step S8).

If a result of the determination in step S9 indicates that the currently outputted torque is less than the threshold torque (step S9: NO), the controller 21 may apply the change rate that is based on the first limit mode to determine the torque to be actually outputted by the electric motor 3, on the basis of the command torque and the currently outputted torque (step S4).

If the torque is determined in step S4 or step S9, the controller 21 may thereafter so control the inverter 4 that the determined torque is outputted (step S10). Thereafter, the controller 21 may return the process to step S1.

If the electric vehicle 1 is determined as being stopped in a parking range or if the switch 35 is determined as being turned off in the determination process in step S3, the controller 21 may reset, to "0", the first flag indicating the occurrence of the slip (step S11). Thereafter, the controller 21 may return the process to step S1.

The process in step S11 may end the torque control that is based on the first traveling state or the third traveling state, and the torque control may be returned to the torque control that is based on the second traveling state (e.g., the normal traveling state).

The drive control process described by way of example above may achieve an operation of the electric vehicle 1 described with reference to FIG. 4.

A program of the drive control process described above may be stored in a non-transitory computer readable medium included in the storage device 22. The controller 21 may be configured to read the program held in a portable non-transitory computer readable medium and execute the program. The portable non-transitory computer readable medium may hold the program of the drive control process described above.

In some embodiments, in the drive control process illustrated in FIG. 5, the controller 21 may perform the following branched process in the determination process in step S3 after determining that the switch 35 is turned off. For example, in a case where the switch 35 is turned off, the controller 21 may cause the process to proceed to the branched process (i.e., step S8) that is performed when the traveling state is determined as the third traveling state, even in a case where the traveling state is determined as being the first traveling state. This process helps to stop the torque control that is based on the first traveling state even during the traveling that involves the occurrence of the slip of the drive wheels 2d on the uphill road, in response to the operation of turning off the switch 35 performed by the driver. In this case, the torque control in which the limit mode of the change rate is switched to the first limit mode or the second switch mode depending on a magnitude of the torque may be stopped, and the torque control may be switched to the torque control to which the flexible second limit mode is applied.

As described in the foregoing, the drive control apparatus 20 of the electric vehicle 1 according to the first example embodiment limits the change rate of the torque on the basis of the first limit mode in a case where the torque is less than the threshold torque, in a period of the first traveling state that is during the traveling on the uphill road in which the level of the likelihood of the occurrence of the slip is estimated as being equal to or greater than the threshold. Further, the change rate of the torque is limited on the basis of the second limit mode that is more flexible than the first limit mode, in a case where the torque is equal to or greater than the threshold torque. Thus, it helps to promptly output the torque that supports the vehicle weight of the electric vehicle 1 along the inclination and to suppress the sliding down of the electric vehicle 1 on the uphill road by applying the first limit mode, in a case where the torque is small. In a case where the torque is large, it helps to avoid the sudden torque change and to suppress the slip of the drive wheels 2 by applying the second limit mode.

In some embodiments, according to the drive control apparatus 20 of the electric vehicle 1, the controller 21 may determine that the traveling state is the first traveling state in a case where the occurrence of the slip is determined during the traveling on the uphill road. Thus, it helps to eliminate an additional detection device necessary for making the determination on the first traveling state and to reduce costs of the drive control apparatus 20. Further, the first traveling state may be determined on the basis of the actual occurrence of the slip. Thus, it helps to accurately determine that the road is the uphill road in which the level of the likelihood of the occurrence of the slip is equal to or greater than the threshold.

In some embodiments, according to the drive control apparatus 20 of the electric vehicle 1, the first limit mode of the change rate of the torque may be the limit mode of the change rate to be applied to a period of the second traveling state in which the occurrence of the slip of the drive wheels 2d is absent (e.g., upon the normal traveling). Thus, it helps to allow the driver to perform the accelerator operation directed to the prevention of the sliding down of the electric vehicle 1 on the uphill road in a similar manner to the accelerator operation that is at the time of the second traveling state, and to reduce a sense of discomfort for the accelerator operation.

In some embodiments, according to the drive control apparatus 20 of the electric vehicle 1, the second limit mode of the change rate of the torque may be the limit mode of the change rate to be applied to a period of the third traveling state in which the slip of the drive wheels 2d has occurred on a road other than the uphill road (e.g., upon the traveling on a road with a low frictional resistance). Thus, it helps to allow the driver to perform the accelerator operation, so controlled as not to cause the sudden torque change so as to prevent the occurrence of the slip, in a similar manner to the accelerator operation that is at the time of the third traveling state, and to reduce a sense of discomfort for the accelerator operation.

In some embodiments, according to the drive control apparatus 20 of the electric vehicle 1, the threshold torque may be set to a value having a positive correlation with the torque that is at the time of the occurrence of the slip. Thus, the smaller threshold torque may be set as the slip occurs easier. Hence, it helps to apply the second limit mode that makes it easier to prevent the sudden change in the torque in a range of the torque in which the slip occurs easily.

Second Example Embodiment

The electric vehicle 1 and the drive control apparatus 20 according to a second example embodiment is substantially similar to those of the first example embodiment described above, with the exception of the torque control following the transition to the first traveling mode in response to the occurrence of the slip. In the following, those that are different from the first example embodiment are described in greater detail.

The controller 21 may first execute the following torque control, after having carried out a control that addresses the slip (e.g., a control that temporarily reduces the torque) following the transition to the first traveling state in response to the occurrence of the slip on the uphill road. For example, upon making the transition to the first traveling state, the controller 21 may set the command torque to a first torque in a case where the accelerator operation amount that is greater than zero is present.

The first threshold torque may be set to the threshold torque. In some embodiments, the first torque may be set to a torque that is at the time when the slip has occurred. In some embodiments, the first torque may be set to a value having a positive correlation with the torque that is at the time of the occurrence of the slip and that is smaller or greater than the torque that is at the time of the occurrence of the slip. In the following, described is an example embodiment in which the first torque corresponds to the threshold torque, i.e., the torque that is at the time of the occurrence of the slip.

After setting the command torque to the first torque, the controller 21 may apply the change rate that is based on the first limit mode to increase the torque to the first torque. Thereafter, in a case where the torque becomes the first torque, the controller 21 may determine whether the electric vehicle 1 travels forward. This determination is referred to as a "first forward traveling determination".

In a case where the electric vehicle 1 travels forward and the accelerator operation amount is fixed at an amount greater than zero for a threshold time or longer as a result of the determination, the controller 21 may fix the torque to the first torque. As used herein, fixing of the accelerator operation amount is not limited to the fixation in a strict sense, and may be a concept that encompasses the accelerator operation amount having a minute fluctuation recognizable by the driver that the operation amount is fixed.

In a case where: the accelerator operation amount is fixed; the torque is fixed to the first torque; and the electric vehicle 1 travels forward, the controller 21 may monitor an inclination of a traveling road. In a case where the inclination of the traveling road has changed, the controller 21 may correct the first torque on the basis of the change in the inclination. For example, the controller 21 may cause the first torque to be small in a case where the inclination is changed at a steep angle, and may cause the first torque to be large in a case where the inclination is changed at a moderate angle. By correcting the first torque, the torque to be outputted from the electric motor 3 may also be corrected similarly. In some embodiments, the controller 21 may correct the threshold torque similarly as well upon correcting the first torque.

Upon an occurrence of a change in the accelerator operation amount in a case where: the accelerator operation amount is fixed; the torque is fixed to the first torque; and the electric vehicle 1 travels forward, the controller 21 may return the process to the torque control that is based on the original first traveling state. For example, the controller 21 may calculate the command torque on the basis of the accelerator operation amount and the vehicle speed. Further, in a case where the torque is less than the threshold torque, the controller 21 may limit the change rate on the basis of the first limit mode, and may determine a torque to be outputted in a subsequent output process on the basis of the command torque and the currently outputted torque. In a case where the torque is equal to or greater than the threshold torque, the controller 21 may limit the change rate on the basis of the second limit mode that is more flexible than the first limit mode, and may determine a torque to be outputted in a subsequent output process on the basis of the command torque and the currently outputted torque.

In a case where the electric vehicle 1 is determined as being stopped in the first forward traveling determination described above, the controller 21 may fix the torque to the first torque on a condition that the accelerator operation amount is fixed (e.g., the accelerator operation amount is fixed for the threshold time or longer). Thereafter, in a case where the accelerator operation amount is increased, the controller 21 may increase or slightly increase the torque regardless of the accelerator operation amount to determine whether the electric vehicle 1 travels forward. This determination is referred to as a "second forward traveling determination".

In a case where the electric vehicle 1 is determined as traveling forward as a result of the second forward traveling determination, the controller 21 may execute a user-interface process that allows the driver to select whether to continue automated forward-traveling driving that is based on the increased or slightly increased torque described above or to switch to the driving that is based on the accelerator operation amount. The driver may operate and select the user-interface process by the switch 36.

As a result, in a case where the operation of the switch 36 is absent and the continuation of the automated forward-traveling driving is selected, the controller 21 may continue the automated forward-traveling driving based on the torque that is increased or slightly increased as described above. In a case where the driving that is based on the accelerator operation amount is selected by the operation of the switch 36, the controller 21 may return the process to the torque control that is based on the original first traveling state. For example, the controller 21 may calculate the command torque on the basis of the accelerator operation amount and the vehicle speed. Further, in a case where the torque is less than the threshold torque, the controller 21 may limit the change rate on the basis of the first limit mode, and may determine a torque to be outputted in a subsequent output process on the basis of the command torque and the currently outputted torque. In a case where the torque is equal to or greater than the threshold torque, the controller 21 may limit the change rate on the basis of the second limit mode that is more flexible than the first limit mode, and may determine a torque to be outputted in a subsequent output process on the basis of the command torque and the currently outputted torque.

In a case where the determination is made that the sliding down of the electric vehicle 1 has occurred as a result of the first forward traveling determination described above, the controller 21 may drive the braking device 6 to stop the sliding down of the electric vehicle 1. In a case where the determination is made that the sliding down of the electric vehicle 1 has occurred as a result of the second forward traveling determination described above, the controller 21 may drive the braking device 6 to stop the sliding down of the electric vehicle 1. Thereafter, the controller 21 may output information that describes a status to the driver, and may end the torque control.

Operation Example

Figure 6:
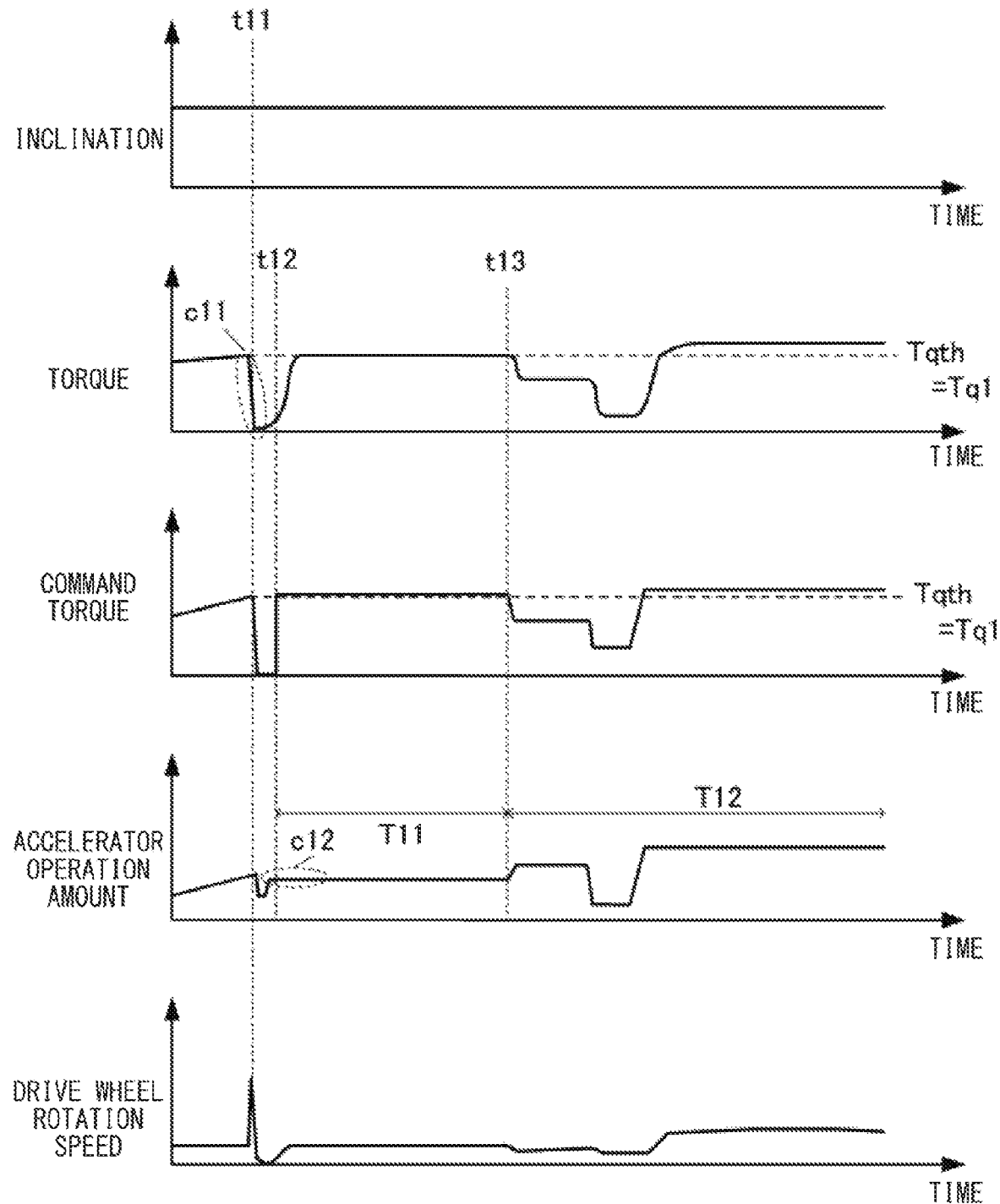
FIG. 6 is a time chart illustrating a first example of an operation of the electric vehicle according to one example embodiment.
Figure 7:
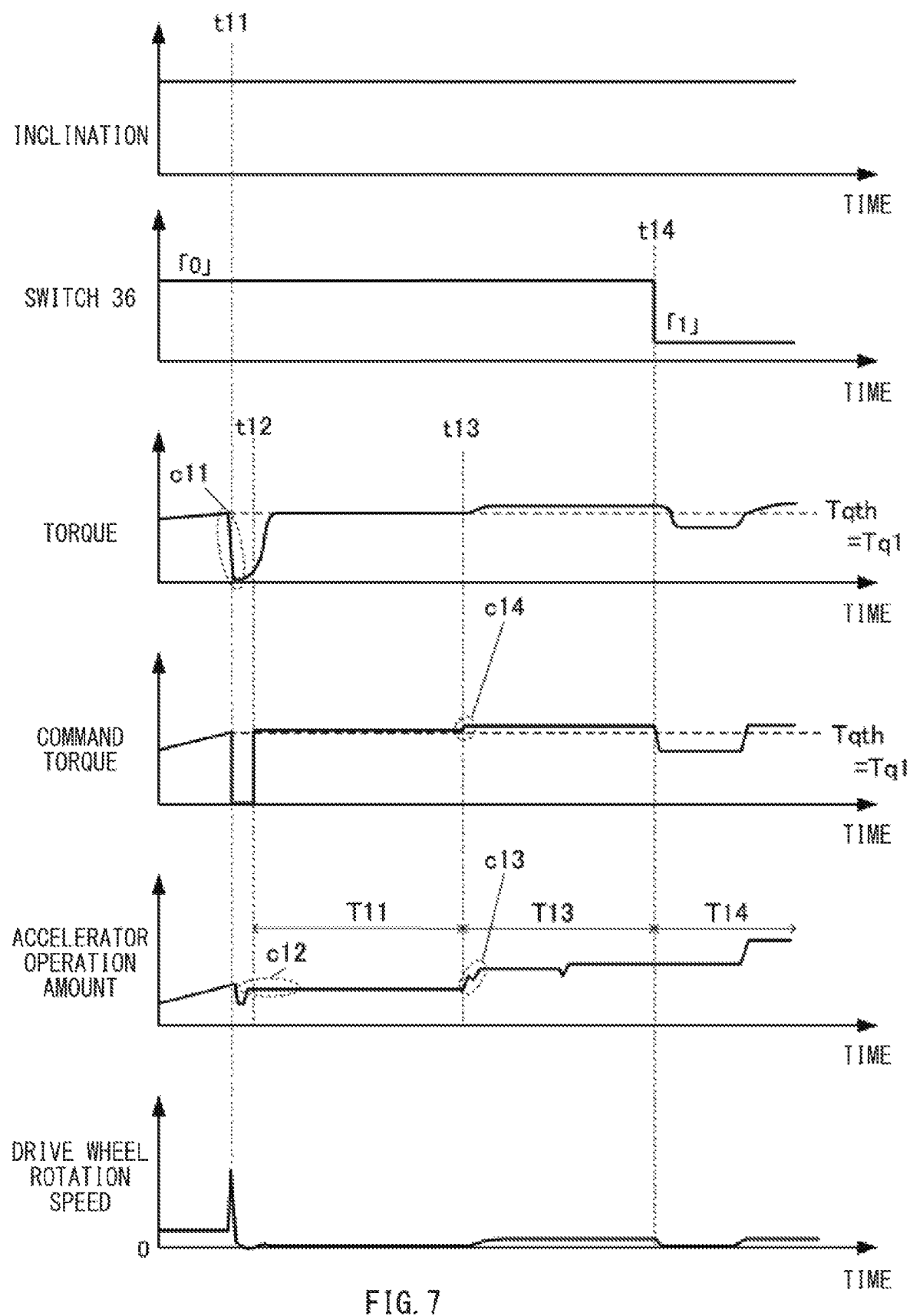
FIG. 7 is a time chart illustrating a second example of the operation of the electric vehicle according to one example embodiment.

FIGS. 6 and 7 are each a time chart illustrating an example of an operation of the electric vehicle 1 according to the second example embodiment. FIGS. 6 and 7 each illustrate an operation upon traveling of the electric vehicle 1 on an uphill road with an extremely low frictional resistance.

Referring to FIGS. 6 and 7, in a case where the slip of the drive wheels 2d has occurred (timing t11) upon traveling of the electric vehicle 1 on an uphill road with a low frictional resistance, the controller 21 may first execute a process that addresses the slip (operation c11). Thereafter, the torque control following the transition to the first traveling state may be started (timing t12). In this case, it can be assumed that the driver may fix the accelerator operation amount to an amount greater than zero owing to the occurrence of the slip by the small torque (operation c12). In a case of the presence of the operation of fixing the accelerator operation amount to the amount greater than zero, the controller 21 may set the command torque to a first torque Tq1 (i.e., the threshold torque Tqth=the torque at the time of the slip), and may fix the torque to the first torque Tq1 in a case where the torque has reached the first torque Tq1 (period T11).

Further, in a case where the electric vehicle 1 travels forward and the accelerator operation amount is still fixed as it is, the controller 21 may continue outputting the first torque Tq1 by which the electric vehicle 1 continue traveling forward, as illustrated in FIG. 6. Here, in a case where the driver changes the accelerator operation amount (timing t13), the controller 21 may switch the process to the torque control that is based on the original first traveling state. Performing the switching described above helps to allow the driver to perform the driving that is based on the accelerator operation (period T12).

Referring to FIG. 7, in a case where the accelerator operation amount is fixed and the torque is fixed to the first torque Tq1 (period T11), the controller 21 may continue outputting the first torque Tq1 if the electric vehicle 1 is stopped. In this case, it can be assumed that, after an elapse of the period T11, the driver may increase the accelerator operation amount (operation c13) to attempt to perform the forward traveling of the electric vehicle 1. In a case where the operation to cause the electric vehicle 1 to travel forward (operation c13) is present, the controller 21 may increase or slightly increase the torque regardless of an amount of increase in the accelerator operation (operation c14) to determine whether the electric vehicle 1 travels forward. As a result, in a case where the electric vehicle 1 travels forward, the forward traveling of the electric vehicle 1 that is based on the increased or slightly increased torque described above may be continued (period T13). In the period T13, the controller 21 may output, to the driver, information that the type of controlling the torque is selectable. As a result, in a case where the operation of the switch 36 is absent and the control of the automated forward-traveling driving is selected, the controller 21 may continue the forward traveling of the electric vehicle 1 based on the torque that is increased or slightly increased as described above.

In a case where a request is made, by the operation of the switch 36, to switch to the driving that is based on the accelerator operation ("1" in FIG. 7) (timing t14), the controller 21 may switch the process to the torque control that is based on the original first traveling state. Thereafter, the driver may thus perform the driving that is based on the accelerator operation (period T14).

[Drive Control Process]

Figure 8:
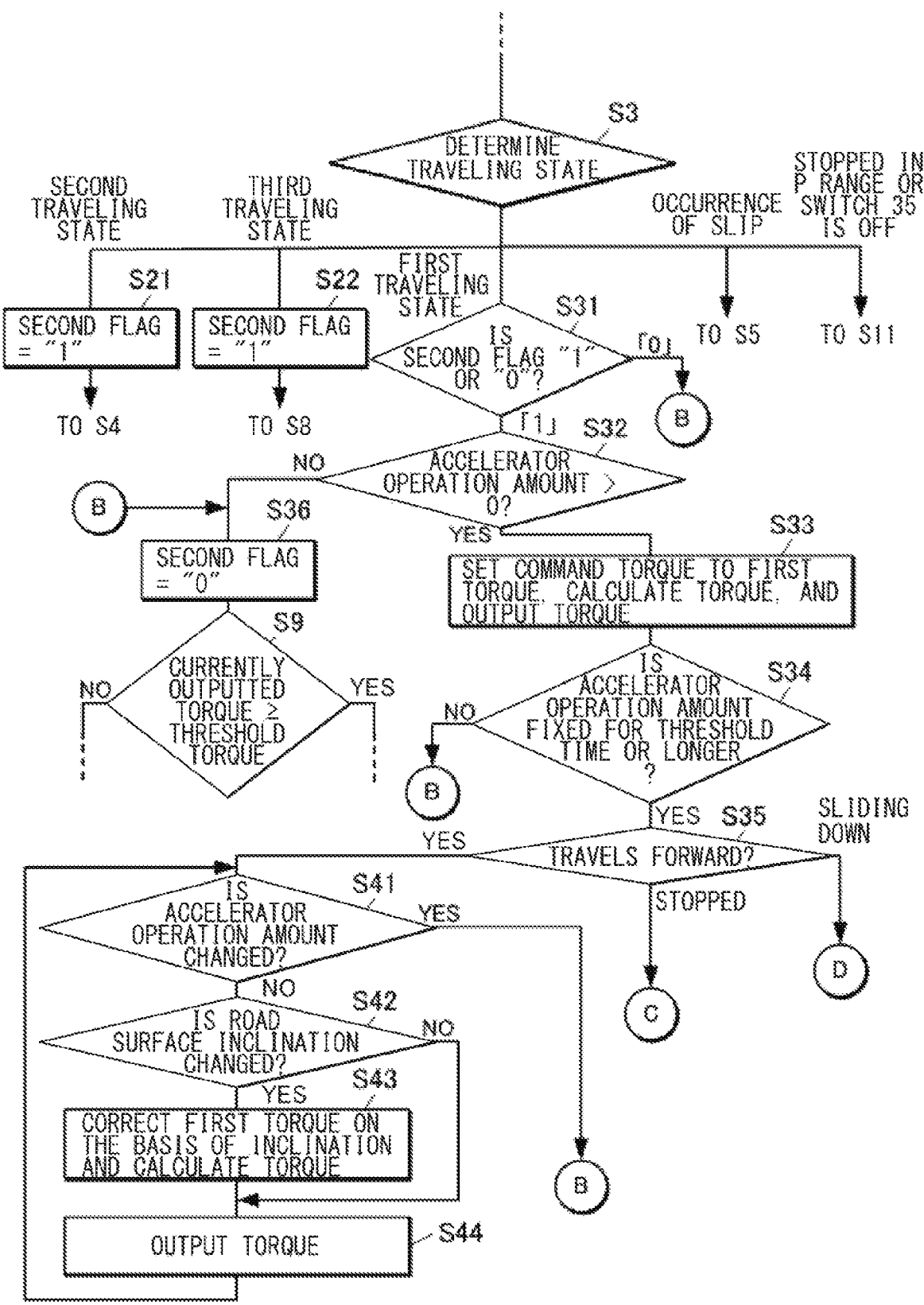
FIG. 8 is a part of a flowchart illustrating a drive control process to be executed by the controller of one example embodiment.
Figure 9:
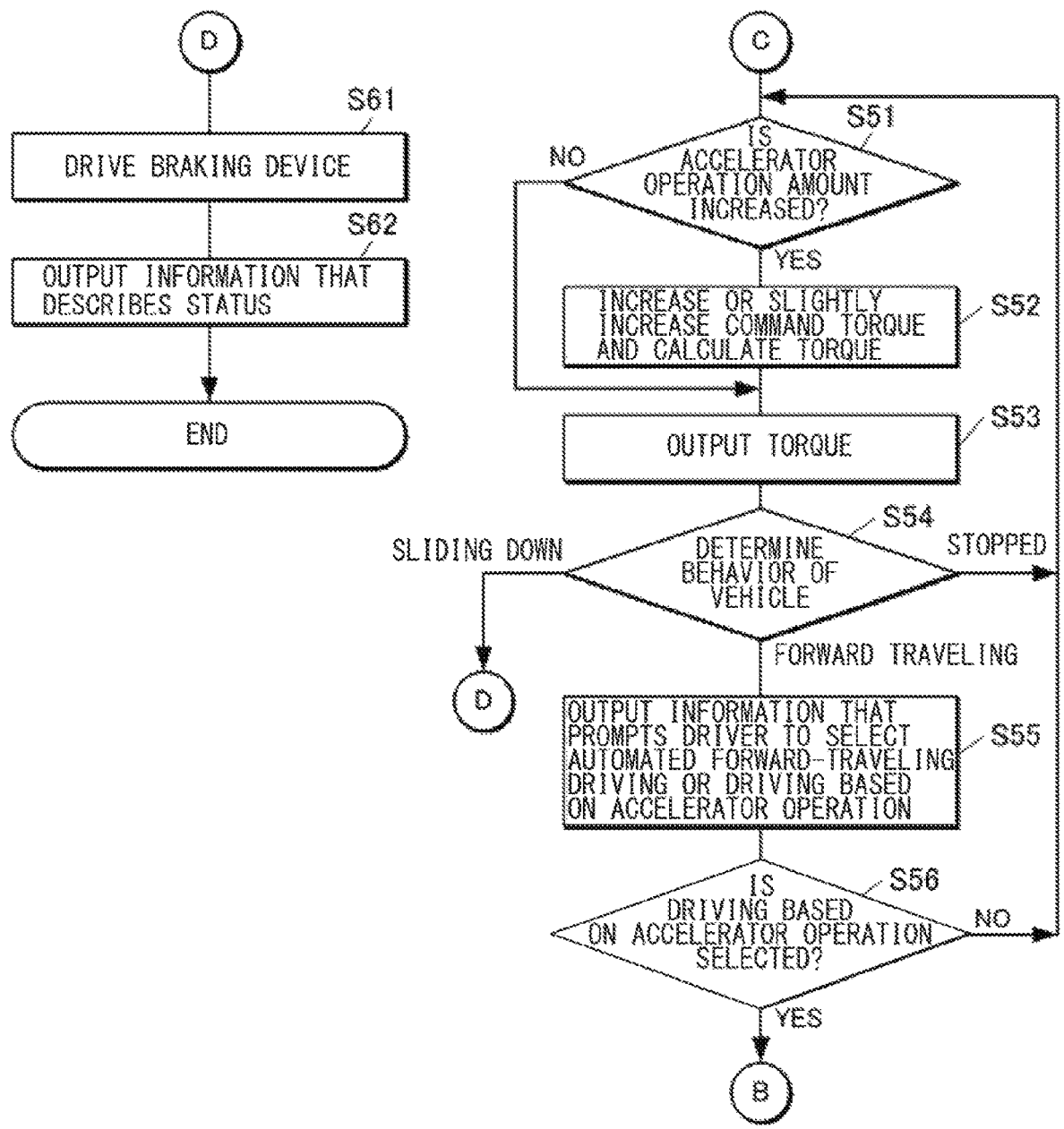
FIG. 9 is a part of the flowchart illustrating the drive control process to be executed by the controller of one example embodiment.

FIGS. 8 and 9 are each a flowchart illustrating the drive control process to be executed by the controller 21 according to the second example embodiment. It should be noted that, in the drive control process according to the second example embodiment, the steps that are same as those of the first example embodiment are denoted with the same reference numeral, and they are not described in detail. It should also be noted that illustration of a series of steps same as the series of steps of the first example embodiment is omitted in FIG. 8.

In the drive control process according to the second example embodiment, the controller 21 may set a second flag to "1" in a case where the traveling state is determined as being the second traveling state or the third traveling state in step S3 (step S21 or S22). The second flag may be a flag directed to a determination as to whether a state is immediately after making the transition to the first traveling state.

If the traveling state is determined as being the first traveling state in step S3, the controller 21 may determine whether the second flag is "1" or "0" (step S31). If the second flag is determined as being "0", the controller 21 may cause the process to proceed to the torque control process (step S9 and steps subsequent thereto) based on the first traveling state which is similar to that of the first example embodiment. Thereafter, the processes from steps S1 to S3, the process of step S31, and the processes of step S9 and steps subsequent thereto may be repeated to continue the torque control process that is based on the first traveling state.

If the second flag is determined as being "1" as a result of the determination in step S31, the controller 21 may determine whether the accelerator operation amount is greater than zero (step S32), because the state is immediately after making the transition to the first traveling state. If a result of the determination in step S32 is YES, the controller 21 may set the command torque to the first torque, calculate the torque on the basis of the command torque by applying the first limit mode, and output the torque to cause the torque to be changed to the first torque (step S33). Thereafter, the controller 21 may determine whether the accelerator operation amount is fixed at an amount greater than zero for a threshold time or longer (step S34). If a result of the determination in step S34 is YES, the controller 21 may thereafter determine whether the electric vehicle 1 travels forward, the electric vehicle 1 is stopped, or the sliding down has occurred (step S35).

If a result of the determination in step S32 is NO or a result of the determination in step S34 is NO, the controller 21 may set the second flag to "0" (step S36). Thereafter, the controller 21 may cause the process to make the transition to step S9. By proceeding to step S9, the transition is made thereafter to the torque control based on the first traveling state which is similar to that of the first example embodiment.

If a result of the determination in step S35 indicates the forward traveling, the controller 21 may cause the process to make the transition to a loop process from steps S41 to S44. In the loop process, the controller 21 may determine whether a change in the accelerator operation amount has occurred (step S41). In addition, the controller 21 may determine whether a change in the inclination has occurred, on the basis of an input from the first detection device (step S42). Thereafter, if the change in the inclination is determined as having occurred (step S42: YES), the controller 21 may correct the first torque on the basis of the change in the inclination, and perform a calculation process of the torque in which the first torque having been subjected to the correction serves as the command torque (step S43). If the change in the inclination is determined as not having occurred (step S42: NO) or in a case where the process in step S43 is performed, the controller 21 may thereafter perform a process of outputting the torque (step S44). If the change in the accelerator operation amount is determined as not having occurred in step S41 (step S41: NO), the controller 21 may repeat the loop process described above.

If a result of the determination in step S41 is YES, i.e., the change in the accelerator operation amount has occurred, the controller 21 may set the second flag to "0" (step S36). Thereafter, the controller 21 may cause the process to make the transition to step S9. By proceeding to step S9, the transition is made thereafter to the torque control based on the first traveling state which is similar to that of the first example embodiment.

If a result of the determination in step S35 indicates that the electric vehicle 1 is stopped, the controller 21 may cause the process to make the transition to a loop process from steps S51 to S56. In the loop process, the controller 21 may first determine whether the accelerator operation amount is increased (step S51). If the accelerator operation amount is determined as being increased (step S51: YES), the controller 21 may slightly increase the command torque as compared with the first torque, and may perform a calculation process of the torque in which the slightly increased first torque serves as the command torque (step S52). If the accelerator operation amount is determined as not being increased (step S51: NO) or in a case where the process in step S52 is performed, the controller 21 may thereafter perform a process of outputting the torque (step S53). Thereafter, the controller 21 may determine how a behavior of the electric vehicle 1 is changed (step S54). If the electric vehicle 1 is determined as traveling forward, the controller 21 may execute a user-interface process (step S55). For example, the controller 21 may output information that prompts the driver to select the automated forward-traveling driving or the driving that is based on the accelerator operation. Thereafter, the controller 21 may determine whether the switch 36 has been switched to the driving that is based on the accelerator operation (step S56). If the sliding down of the electric vehicle 1 is not determined in step S54 or a particular selection is not made in step S56 (step S56: NO), the controller 21 may repeat the loop process described above.

If a result of the determination in step S56 is YES, the controller 21 may set the second flag to "0" (step S36). Thereafter, the controller 21 may cause the process to make the transition to step S9. By proceeding to step S9, the transition is made thereafter to the torque control based on the first traveling state which is similar to that of the first example embodiment.

If a result of the determination in step S35 or S54 indicates the sliding down of the electric vehicle 1, the controller 21 may drive the braking device 6 to stop the sliding down of the electric vehicle 1 (step S61). Thereafter, the controller 21 may output information that describes a status to the driver (step S62), and may end the drive control process.

The drive control process described by way of example above may achieve the torque control according to the second example embodiment described above.

A program of the drive control process described above may be stored in a non-transitory computer readable medium included in the storage device 22. The controller 21 may be configured to read the program held in a portable non-transitory computer readable medium and execute the program. The portable non-transitory computer readable medium may hold the program of the drive control process described above.

The drive control apparatus 20 of the electric vehicle 1 according to the second example embodiment described above makes it possible to achieve at least one of the following example effects in addition to the workings and the example effects according to the first example embodiment. According to the drive control apparatus 20 of the electric vehicle 1 according to the second example embodiment, the controller 21 may change the torque to the first torque Tq1 in a case where the accelerator operation amount is greater than zero, following the transition to the first traveling state in response to the occurrence of the slip. Thereafter, the controller 21 may fix the torque to the first torque Tq1, in a case where the accelerator operation amount is fixed at an amount greater than zero for the threshold time or longer and where the electric vehicle travels forward, as illustrated in FIG. 6. The first torque Tq1 may be set to a value having a positive correction with the torque that is at the time of the occurrence of the slip. For example, the first torque Tq1 may be set to the same value as the torque that is at the time of the occurrence of the slip. Thus, it helps to carry out the appropriate torque control for an accelerator operation often assumed to be performed by the driver (e.g., the accelerator operation amount is fixed to an amount greater than zero), in a case where the slip can occur by a small amount of accelerator operation on an uphill road with an extremely low road surface frictional resistance. Accordingly, it helps to promptly carry out the torque control that avoids the sliding down of the electric vehicle 1 and to allow the electric vehicle 1 to continue the forward traveling.

In some embodiments, the drive control apparatus 20 of the electric vehicle 1 may include the first detection device 32 configured to detect an inclination of a traveling road. The controller 21 may correct a value of the first torque Tq1 in a case where the inclination of the traveling road has changed on the basis of an output of the first detection device 32, on a condition that the torque is fixed to the first torque Tq1 and that the electric vehicle 1 travels forward. Thus, it helps to, even in a case where the level of the likelihood of the occurrence of the slip on the uphill road has changed due to the change in the inclination, so change the torque as to address the change in the level of the likelihood of the occurrence of the slip. This in turn helps to continue the forward traveling of the electric vehicle 1 easily while suppressing the slip.

In some embodiments, according to the drive control apparatus 20 of the electric vehicle 1, the controller 21 may change the torque to the first torque Tq1 in a case where the accelerator operation amount is greater than zero, following the transition to the first traveling state in response to the occurrence of the slip. Thereafter, the controller 21 may fix the torque to the first torque Tq1, in a case where the accelerator operation amount is fixed at an amount greater than zero for the threshold time or longer and where the electric vehicle 1 is stopped. In a case where the accelerator operation amount is increased, the controller 21 may increase or slightly increase the torque regardless of the accelerator operation amount, and may determine whether the electric vehicle 1 has traveled forward by the increase in the torque. If the electric vehicle 1 is determined as traveling forward, the controller 21 may execute the user-interface process that allows the driver to select whether to perform the automated forward-traveling driving or the driving that is based on the accelerator operation amount, as illustrated in FIG. 7. Thus, it helps to increase a possibility of causing the electric vehicle 1 to travel forward by the torque control that is independent of the accelerator operation amount described above, even on an uphill road where both the slip and the sliding down of the electric vehicle 1 can occur easily. Further, it helps to return the driving to the driving that is based on the accelerator operation amount in response to the driver's selection.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, described above in some example embodiments of the disclosure is the drive control apparatus of the electric vehicle having the driven wheels. However, any embodiment of the disclosure may be applied to the drive control apparatus of an all-wheel-drive electric vehicle having no driven wheels. In this case, the torque to be controlled may be a total torque, a front wheel torque, or a rear wheel torque. In addition, described above in some example embodiments of the disclosure is the electric vehicle that does not have an engine serving as an internal-combustion engine, as the electric vehicle 1 to be mounted with the drive control apparatus. In some embodiments, the electric vehicle may be HEV (Hybrid Electric Vehicle) having the engine. Further, described above in some example embodiments of the disclosure is an example of the accelerator operation amount as an amount of operation performed on the accelerator operation unit 11b by the driver. In some embodiments, the accelerator operation amount may be an amount of operation of an accelerator performed by an automated driving system. In addition, any part described in some embodiments of the disclosure may be variously modified without departing from the scope as defined by the appended claims.

According to at least one embodiment of the disclosure, a change rate of a torque is limited on the basis of a second limit mode, in a case where the torque to be outputted from an electric motor is equal to or greater than a threshold torque in a period of a first traveling state. This helps to suppress a sudden change in the torque to be outputted to a drive wheel. Hence, it helps to suppress an occurrence of a slip of the drive wheel. In a case where the torque to be outputted from the electric motor is less than the threshold torque, the change rate of the torque is limited on the basis of a first limit mode. This helps to cause the torque to be large relatively quickly. Hence, it helps to promptly output the torque that makes it possible to support a vehicle weight of a vehicle along an inclination, and helps to reduce an occurrence of sliding down of the vehicle.

The controller 21 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 21 illustrated in FIG. 1.

The invention claimed is:

1. A drive control apparatus to be applied to an electric vehicle that includes a drive wheel and an electric motor configured to drive the drive wheel, the drive control apparatus comprising a controller configured to control a torque to be outputted from the electric motor, on a basis of an amount of operation of an accelerator as an accelerator operation amount and a state of the electric vehicle as a vehicle state, wherein
the controller is configured to:
determine whether the electric vehicle is in a first traveling state in which the drive wheel has slipped while the electric vehicle is traveling on an uphill road;
in response to determining that the electric vehicle is in the first traveling state, determine whether the torque currently being output by the motor is less than a threshold torque;
in response to determining that the torque is less than the threshold torque, limit a change rate of the torque under a first limit mode; and
in response to determining that the torque is equal to or greater than the threshold torque, limit the change rate of the torque under a second limit mode, wherein the controller is further configured to limit the change rate of the torque both in the first limit mode and the second limit mode while allowing the torque to increase more quickly in the first limit mode than in the second limit mode.

2. The drive control apparatus of the electric vehicle according to claim 1, wherein
the first limit mode comprises a limit mode of the change rate to be applied to a period of a second traveling state in which occurrence of the slip of the drive wheel is absent,
the second limit mode comprises a limit mode of the change rate to be applied to a period of a third traveling state in which the occurrence of the slip of the drive wheel is present other than on the uphill road, and
the threshold torque is set to a value having a positive correlation with the torque that is at time of the occurrence of the slip.

3. The drive control apparatus of the electric vehicle according to claim 2, wherein
the controller is configured such that
in a case where the accelerator operation amount is greater than zero following a transition of a traveling state of the electric vehicle to the first traveling state in response to the occurrence of the slip, the controller changes the torque to a first torque, and
in a case where the accelerator operation amount is fixed at an amount greater than zero for a threshold time or longer after changing the torque to the first torque, the controller fixes the torque to the first torque, and
the first torque is set to a value having a positive correlation with the torque that is at time of the occurrence of the slip.

4. The drive control apparatus of the electric vehicle according to claim 3, further comprising a detection device configured to detect an inclination of a traveling road where the electric vehicle is travelling, wherein
the controller is configured such that
in a case where the torque is fixed to the first torque and where the electric vehicle travels forward, the controller acquires an output of the detection device, and
upon determining that the inclination of the traveling road is changed on a basis of the output, the controller corrects a value of the first torque on a basis of the inclination.

5. The drive control apparatus of the electric vehicle according to claim 4, wherein the controller is configured such that
in a case where the torque is fixed to the first torque and where the electric vehicle is stopped, the controller determines whether the accelerator operation amount is increased, and
upon determining that the accelerator operation amount is increased, the controller increases the torque regardless of the accelerator operation amount.

6. The drive control apparatus of the electric vehicle according to claim 3, wherein the controller is configured such that
in a case where the torque is fixed to the first torque and where the electric vehicle is stopped, the controller determines whether the accelerator operation amount is increased, and
upon determining that the accelerator operation amount is increased, the controller increases the torque regardless of the accelerator operation amount.

7. The drive control apparatus of the electric vehicle according to claim 1, wherein
the controller is configured such that
in a case where the accelerator operation amount is greater than zero following a transition of a traveling state of the electric vehicle to the first traveling state in response to occurrence of the slip, the controller changes the torque to a first torque, and
in a case where the accelerator operation amount is fixed at an amount greater than zero for a threshold time or longer after changing the torque to the first torque, the controller fixes the torque to the first torque, and
the first torque is set to a value having a positive correlation with the torque that is at time of the occurrence of the slip.

8. The drive control apparatus of the electric vehicle according to claim 7, further comprising a detection device configured to detect an inclination of a traveling road where the vehicle is travelling, wherein
the controller is configured such that
in a case where the torque is fixed to the first torque and where the electric vehicle travels forward, the controller acquires an output of the detection device, and
upon determining that the inclination of the traveling road is changed on a basis of the output, the controller corrects a value of the first torque on a basis of the inclination.

9. The drive control apparatus of the electric vehicle according to claim 7, wherein the controller is configured such that
in a case where the torque is fixed to the first torque and where the electric vehicle is stopped, the controller determines whether the accelerator operation amount is increased, and
upon determining that the accelerator operation amount is increased, the controller increases the torque regardless of the accelerator operation amount.

10. The drive control apparatus of the electric vehicle according to claim 7, wherein the controller is configured such that
in a case where the torque is fixed to the first torque and where the electric vehicle is stopped, the controller determines whether the accelerator operation amount is increased, and
upon determining that the accelerator operation amount is increased, the controller increases the torque regardless of the accelerator operation amount.

11. The drive control apparatus of the electric vehicle according to claim 1, wherein the controller is further configured to determine that the vehicle is in the first driving state after a first timing at which the drive wheel has slipped while the electric vehicle is traveling on the uphill road, and until a second timing, wherein the second timing is a timing at which the electric vehicle starts traveling on a flat road.

12. The drive control apparatus of the electric vehicle according to claim 1, wherein the controller is further configured to determine that the vehicle is in the first driving state after a first timing at which the drive wheel has slipped while the electric vehicle is traveling on the uphill road, and until a second timing, wherein the second timing is a timing at which the electric vehicle stops in a parking range or which a power of a system of the electric vehicle is turned off.

13. A drive control apparatus to be applied to an electric vehicle that includes a drive wheel and an electric motor configured to drive the drive wheel, the drive control apparatus comprising circuitry configured to control a torque to be outputted from the electric motor, on a basis of an amount of operation of an accelerator as an accelerator operation amount and a state of the electric vehicle as a vehicle state, wherein
  the circuitry is configured to:
    determine whether the electric vehicle is in a first traveling state in which the drive wheel has slipped while the electric vehicle is traveling on an uphill road;
    in response to determining that the electric vehicle is in the first traveling state, determine whether the torque currently being output by the motor is less than a threshold torque;
    in response to determining that the torque is less than the threshold torque, limit a change rate of the torque under a first limit mode; and
    in response to determining that the torque is equal to or greater than the threshold torque, limit the change rate of the torque under a second limit mode,
  wherein the circuitry is further configured to limit the change rate of the torque both in the first limit mode and the second limit mode while allowing the torque to increase more quickly in the first limit mode than in the second limit mode.

* * * * *